(12) United States Patent
Bourlon et al.

(10) Patent No.: US 6,978,614 B2
(45) Date of Patent: Dec. 27, 2005

(54) MASTER CYLINDER COMPRISING A VALVE WITH REDUCED PEDAL FREE TRAVEL

(75) Inventors: Philippe Bourlon, Dammartin en Goele (FR); Pierre Lebret, Versailles (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/488,735

(22) PCT Filed: Sep. 6, 2002

(86) PCT No.: PCT/FR02/03045

§ 371 (c)(1),
(2), (4) Date: Mar. 29, 2004

(87) PCT Pub. No.: WO03/022652

PCT Pub. Date: Mar. 20, 2003

(65) Prior Publication Data
US 2004/0206081 A1    Oct. 21, 2004

(30) Foreign Application Priority Data
Sep. 10, 2001  (FR)  ................................ 01 11758

(51) Int. Cl.$^7$ ............................................. F15B 7/08
(52) U.S. Cl. ..................................................... 60/588
(58) Field of Search ................................ 60/588, 589

(56) References Cited

U.S. PATENT DOCUMENTS

| | | | | |
|---|---|---|---|---|
| 4,685,300 A | * | 8/1987 | Steer .............................. | 60/589 |
| 4,989,498 A | * | 2/1991 | Mori et al. .................... | 60/588 |
| 5,063,743 A | * | 11/1991 | Mori et al. .................... | 60/588 |
| 5,187,934 A | * | 2/1993 | Mori ............................ | 60/588 |

\* cited by examiner

*Primary Examiner*—Edward K. Look
*Assistant Examiner*—Michael Leslie
(74) *Attorney, Agent, or Firm*—Leo H McCormick, Jr.; Warren Comstock (57) ABSTRACT

This invention relates to a master cylinder (10), inside a bore (14) of which two axial primary and secondary pistons (16, 18), are slidingly fitted, and in which at least one sealing means (48, 50) is disposed in contact with each piston, defining a supply chamber (56, 60) and a pressure chamber (58, 62). Each piston (16, 18) comprises a bore (78, 80), open in the direction of the front pressure chamber (58, 62), and the piston (18) comprises a valve-forming through-hole (88), opening into its periphery and into its bore (80), in order to isolate the front pressure chamber when it passes beyond the sealing means so as to produce a braking pressure, characterised in that the front pressure chamber (62) associated with at least one piston (18) comprises at least one tubular cylindrical element (90) extending axially outside the piston (18) and rearwards of the sealing means (50) for the obturation of the through-hole (88) according to a reduced stroke ($C_{m2}$).

7 Claims, 9 Drawing Sheets

Fig. 1

Prior Art

MASTER CYLINDER COMPRISING A VALVE WITH REDUCED PEDAL FREE TRAVEL

This invention relates to a hydraulic-braking master cylinder of the "tandem" type for a motor vehicle.

More particularly, the present invention relates to a hydraulic-braking master cylinder of the "tandem" type for a motor vehicle, of the type comprising a substantially axial body, inside a bore of which two axial pistons, namely a primary one and a secondary one, are slidingly fitted in the back-to front direction respectively, and are capable of being actuated by the driver of the vehicle, between a rest rear position and a forward position, in which a braking force is applied; of the type in which each piston is resiliently returned to its rest rear position onto a first rear stop; of the type in which at least one sealing means is disposed between each piston and the bore so as to define, within the bore, a rear hydraulic-fluid supply chamber and a front pressure chamber; of the type in which each piston comprises a bore, open in the forward direction and communicating with the front pressure chamber; of the type in which the piston comprises at least one substantially radial valve, opening into its periphery and into its bore, and capable of moving between a let-through position, which corresponds to the rest rear position of the piston, and in which the valve is situated rearwards of the sealing means and connects the rear supply chamber with the front pressure chamber, and an isolating position, which corresponds to the forward application position of the piston and in which the valve is situated forwards of the sealing means and separates the rear supply chamber from the front pressure chamber, so as to produce a hydraulic braking pressure inside the front pressure chamber.

Numerous implementations of a master cylinder of said type are well known.

In such a master cylinder, it is only once the associated piston has covered a determined distance, the so-called "dead stroke", which is the distance between the rest position of the radial valve of the piston and the sealing means, that the hydraulic braking pressure may be produced inside each pressure chamber.

As a matter of fact, as long as the radial valve is situated rearwards of the sealing means, the rear supply chamber and the front pressure chamber are communicating and under an equal pressure.

But when, as a result of the forward travel of the piston, the radial valve has moved past the sealing means, i.e. when the piston has covered all the "dead stroke", the front pressure chamber is separated from the rear supply chamber and consequently the hydraulic braking pressure increases inside the front pressure chamber as the piston is moving forwards.

Therefore so as to produce, as quickly as possible, a hydraulic braking pressure in the front pressure chamber taken into consideration, the "dead stroke" of the piston should be reduced as much as possible.

Now, a modification of the design dimensions of the master cylinder could not possibly reduce the distance between the radial valve of the piston at rest and the sealing means.

As a matter of fact, on the one hand, at rest, the radial valve must face a supply port, which communicates with a hydraulic-fluid tank for the master cylinder.

On the other hand, the sealing means, generally in the form of a lip seal accommodated inside a groove provided in the master cylinder, is situated away from the supply port, by at least a distance corresponding to the thickness of a wall of the groove intended for the retention of the lip seal.

The document U.S. Pat. No. 4,989,498 discloses a front pressure chamber, associated with at least one piston, and comprising at least one tubular cylindrical element outside the piston and retained axially in the body of the master cylinder, said cylindrical element extending axially rearwards of the sealing means and being capable, when the piston travels forwards, of obturating the radial valve so as to obtain a closing travel of the valve which is smaller than the distance between the valve and the sealing means.

Yet it is essential that the pressure chamber should be quickly resupplied towards the end of a braking operation. But the master cylinder, as described in U.S. Pat. No. 4,989,498, does not ensure such a quick resupply.

Therefore, it is an object of the present invention to provide an improved means for the reduction of the "dead stroke", in that an element is interposed in order to seal off the radial valve before the latter passes the sealing means.

To this end, the invention provides a master cylinder of the above-described type, characterised in that a substantially annular space for the resupply of the front pressure chamber is provided between the body of the master cylinder and the sealing tubular element, said space connecting the front pressure chamber to the rear supply chamber.

According to other features of this invention the sealing means consists of a lip seal, accommodated in a groove made in the bore of the master cylinder the sealing means comprises an upper lobe, sealing off the space intended for the resupply of the front pressure chamber when the pressure, prevailing inside the front pressure chamber, is higher than that inside the rear supply chamber, and letting the brake fluid through from the rear supply chamber into the front pressure chamber, when the pressure, prevailing inside the front pressure chamber, is lower than that inside the rear supply chamber;

the piston is made in a single piece, and the radial valve comprises at least one through-hole opening into the periphery and into the bore of the piston ;

the tubular cylindrical element consists of an annular ring having an inner diameter equal to that of the piston, said ring being adjacent to the back face of the lip seal and being accommodated inside a complementary groove provided in the master cylinder;

the seal comprises a further lip, bearing on a front transverse face of the annular ring;

the ring is slit so as to facilitate its fitting at least from the rear part of the master cylinder;

the master cylinder comprises a front-end transverse face capable of being dismounted for the insertion of at least a solid ring and of the lip seal, from the front part of the master cylinder;

the master cylinder comprises a further lip seal, arranged rearwards of a hydraulic-fluid feed channel which opens into the supply chamber of the piston, the ring being axially disposed between the lip seals;

the ring has a radial through-hole, facing the hydraulic-fluid feed channel each of the front- and rear-end transverse faces of the ring comprises an annular groove for the accommodation of a complementary flange for the retention of the adjoining lip seal.

Other features and advantages of the present invention will be apparent from the following detailed description, when taken in conjunction with the accompanying drawings, in which.

In the following description, the same reference numerals will designate the same elements, or elements having similar functions.

As a rule, the terms "front" and "rear" refer respectively to elements or positions facing leftward, or rightward in FIG. 1 through 6.

Figure 1:
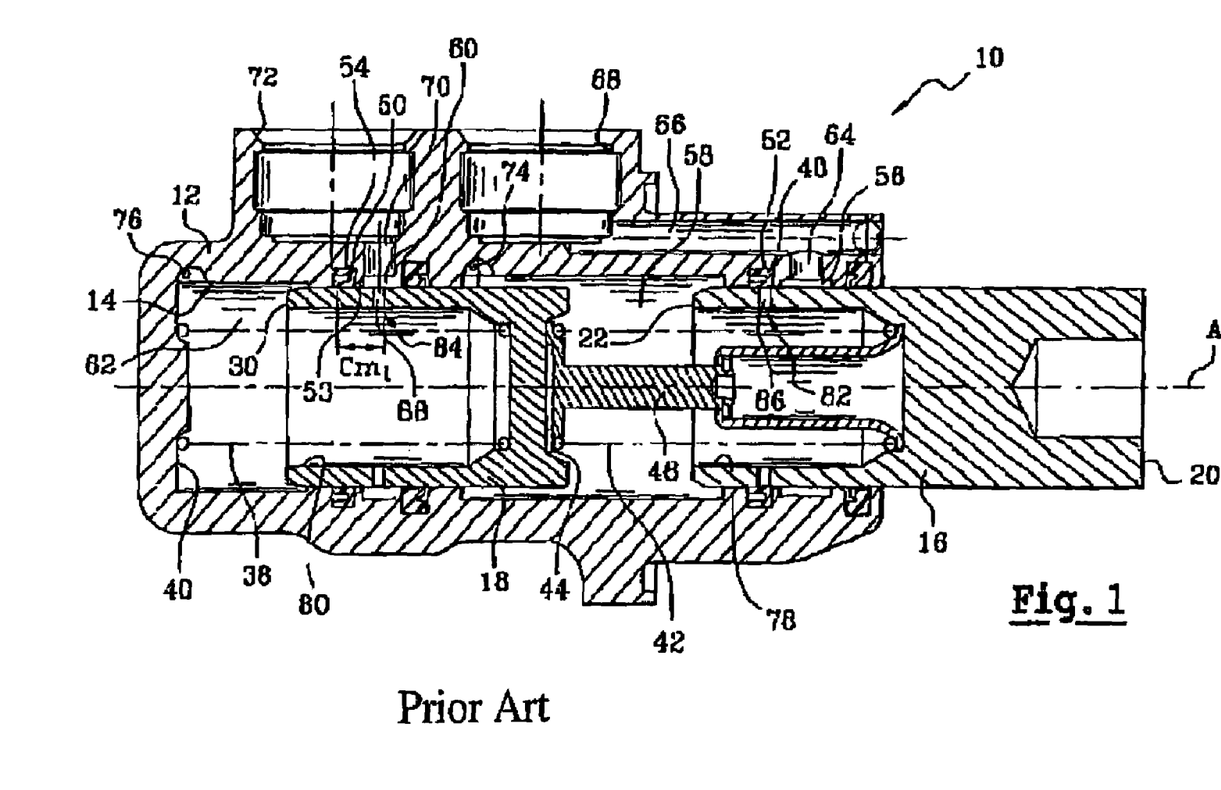
FIG. 1 is an axial sectional view of a master cylinder of the "tandem" type, according to a prior art and shown in the rest position.

FIG. 1 is a general view of a braking master cylinder 10 for a motor vehicle.

In a well-known manner, the master cylinder 10 is a master cylinder of the "tandem" type, which comprises a substantially axial body 12 having an axis A and inside a bore 14 of which two axial pistons 16 and 18 are fitted for a sliding travel.

The piston 16, the so-called primary piston 16, is intended to produce a hydraulic pressure in a primary braking circuit of the vehicle (not shown), and the piston 18, which is the so-called secondary piston 18, is designed to produce a hydraulic pressure in a secondary braking circuit of the vehicle (not shown), which is independent of the primary braking circuit.

The primary piston 16 is capable of being directly actuated by the driver of the vehicle. For instance, a rear end 20 of the primary piston 16 may be connected to a servomotor (not shown) which amplifies the force exerted on a brake pedal of the vehicle.

The secondary piston 18 is capable of being indirectly actuated by the driver of the vehicle, more particularly through the primary piston 16, in a way to be explained hereafter.

Therefore, each piston, that is the primary piston 16 and the secondary piston 18, is movable between a rest rear position, illustrated in FIG. 1, and a front position (not shown) in which a braking force is applied.

As is well known too, both the primary piston 16 and the secondary piston 18 are resiliently returned to their rest rear positions. Each piston may be resiliently returned to its rest rear position so as to bear on a stop (not shown).

The secondary piston 18 is biased rearwards by means of a spring 38, bearing on a front-end transverse face 40 of the bore 14 and on the secondary piston 18, and the primary piston 16 is biased rearwards by means of a spring 42, bearing on a rear transverse face 44 of the secondary piston 18 and on the primary piston 16. More particularly, the spring 42 is fitted about a sliding actuator 46, interposed between the rear transverse face 44 of the secondary piston 18 and the primary piston 16. The spring 42 is prestressed through the spring 38.

The master cylinder comprises at least two front sealing means, namely a primary one 48 and a secondary one 50, which are interposed between the primary piston 16 and the bore 14, and between the secondary piston 18 and the bore 14, respectively.

In the preferred embodiment of the present invention, but by no means as a limitation, the primary and secondary sealing means consist of lip seals 48 and 50, accommodated in grooves 52 and 54 provided in the body 12 and situated rearwards of shoulder-forming portions 28 and 36 of the bore 14, respectively. Each seal 48, 50 comprises at least one lip, which is in contact with the periphery of the associated piston 16, 18.

Of course, such arrangement should by no means be considered as a limitation imposed on the invention, and the seals 48, 50 might just as well be received in cylindrical housings inserted in the body of the master cylinder and comprising wholly or partly the grooves 52, 54 accommodating the seals 48, 50.

The primary sealing means 48 defines, within the bore 14, a primary rear supply chamber 56 and a primary front pressure chamber 58. In the same way, the secondary sealing means 50 defines, within the bore 14, a secondary rear supply chamber 60 and a secondary front pressure chamber 62.

The body 12 comprises a primary radial feed channel 64 connecting an external primary hydraulic-fluid tank (not shown) to the primary rear supply chamber 56.

More particularly, the primary radial channel 64 is connected, e.g. through an intermediate longitudinal channel 66, to a port 68 opening outside the body 12 and intended to receive an outlet duct (not shown) of the associated primary tank.

In the same way, the body 12 comprises a secondary radial feed channel 70 connecting an external secondary hydraulic-fluid tank (not shown) to the secondary rear supply chamber 60. This channel 70 opens outside the body 12 through a port 72, which is intended to receive an outlet duct (not shown) of the associated secondary tank.

The body 12 is provided with two through-holes, namely a primary one 74 and a secondary one 76 which open, on the one hand, into the primary and secondary pressure chambers, 58 and 62 respectively and, on the other hand, to the outside of the body 12 so as to feed the respective primary and secondary braking circuits (not shown).

In a well-known manner, each piston 16, 18 comprises a bore 78, 80, open in the forward direction and communicating with the front pressure chamber 58, 62. Each piston 16, 18 comprises at least one valve 82, 84 disposed between the rear supply chamber 56, 60 and the bore 78, 80 of the piston 16, 18.

Each valve 82, 84 comprises, by way of example and by no means as a limitation, at least one radial through-hole 86, 88 provided between the bore 78, 80 of each piston 16, 18 and its periphery, and the position of which in relation to the lip seal 48, 50 either permits or prohibits the flow of hydraulic fluid from the rear supply chamber 56, 60 towards the front pressure chamber 58, 62.

Thus, each valve 82, 84, is capable of moving between an open position, illustrated in FIG. 1, in which, when one of the pistons 16, 18 is in its rest rear position, it connects the rear supply chamber 56 or 60 of said piston 16, 18 with the front pressure chamber 58 or 62 of said piston 16, 18, and a closed position (not shown) in which, when the piston 16, 18 is moved axially forwards towards its application position, it separates the respective front pressure chamber 5.8, 62 from the respective rear supply chamber 56, 60 so as to produce a braking pressure inside the front pressure chamber 58, 62.

In the subsequent description, it is the mode of operation of the secondary piston 18 in the secondary front pressure chamber 62 which will be dealt with in greater detail, considering that the primary and secondary pistons 16, 18 operate in a substantially similar manner.

More particularly, in the above-mentioned arrangement, the closing of the secondary valve 84 can only occurs when the secondary piston 18 has moved by a stroke "$C_{m1}$", that is the so-called "dead stroke", which corresponds to the distance between the through-hole 88 and the seal 50.

Thus, as long as the piston 18 has not covered the dead stroke "$C_{m1}$", the through-hole 88 remains rearwards of the lip seal 50 and the hydraulic fluid can flow from the secondary rear supply chamber 60 into the secondary front pressure chamber 62. In this case, the valve 84 is open.

On the other hand, once the piston 18 has covered the dead stroke "$C_{m1}$", the through-hole 88 has passed the lip seal 50 and the hydraulic fluid flow from the secondary rear supply chamber 60 into the secondary front pressure chamber 62 is stopped. In this case, the valve 84 is closed.

Now, in order to benefit from a highly efficient braking operation, it is essential that the value of the dead stroke should be reduced as much as possible.

But, in the above-described arrangement, the distance between the through-hole 88 and the seal 50 cannot be reduced at all.

As a matter of fact, on the one hand, a rear wall 53 of the groove 54 must be thick enough for the adequate retention of the seal 50 inside the associated groove 54. And, on the other hand, in the rest position of the piston 18, the through-hole 88 must substantially face the feed channel 70 so as to obtain an optimum supply of the valve 84 with hydraulic fluid.

So as to eliminate such a disadvantage, the present invention provides a master cylinder of the above-described type, characterised in that the front pressure chamber 62, associated with at least one piston 16, 18, comprises at least one tubular cylindrical element, which is disposed outside the piston 16, 18 and extends axially rearwards of the sealing means and which is capable, when the piston 16, 18 travels forwards, of obturating the radial valve for the valve-closing dead stroke to be smaller than the distance between the valve and the sealing means.

Therefore and still referring to the operating conditions of the secondary piston, as illustrated in the figures, the master cylinder is characterised in that the front pressure chamber 62, associated with the secondary piston 18, comprises at least one tubular cylindrical element 90 which is disposed outside the piston 18 and extends axially rearwards of the sealing means 50 and which is capable, when the secondary piston 18 travels forwards, of obturating the radial valve 84 so as to obtain a dead stroke "$Cm_2l$" for the closing of the valve 84, which is smaller than the distance between the valve 84 and the sealing means 50.

FIG. 2A through 2C and 5A through 6 illustrate several embodiments of a master cylinder 10 comprising such a tubular cylindrical element 90.

Figure 2A:
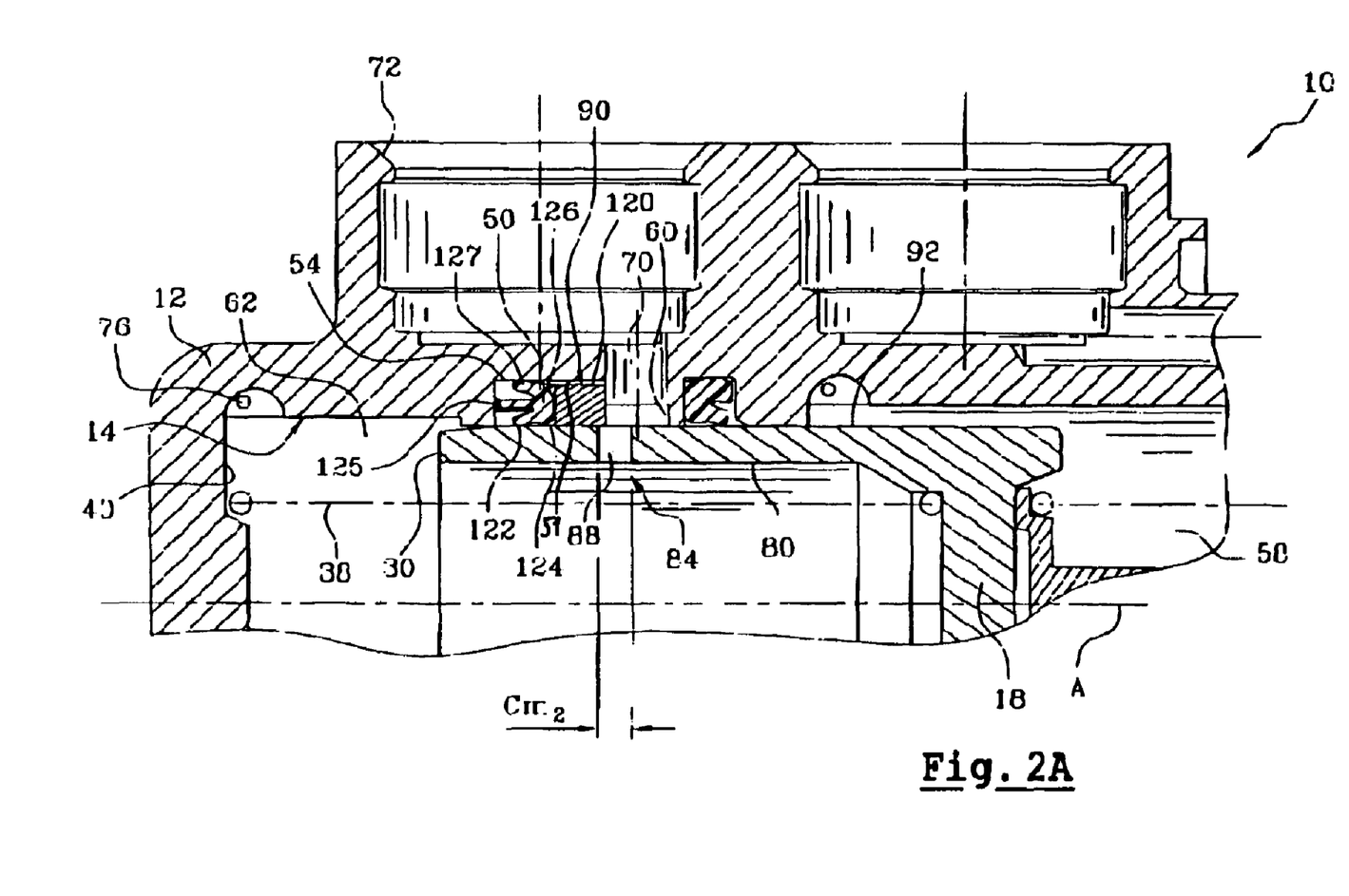
FIG. 2A–2C are detail sectional views of a master cylinder of the "tandem" type according to a first embodiment of the present invention, and represented in the rest position, in the isolating position of the secondary front pressure chamber and in the position in which the secondary piston applies a braking force, respectively.
Figure 2B:
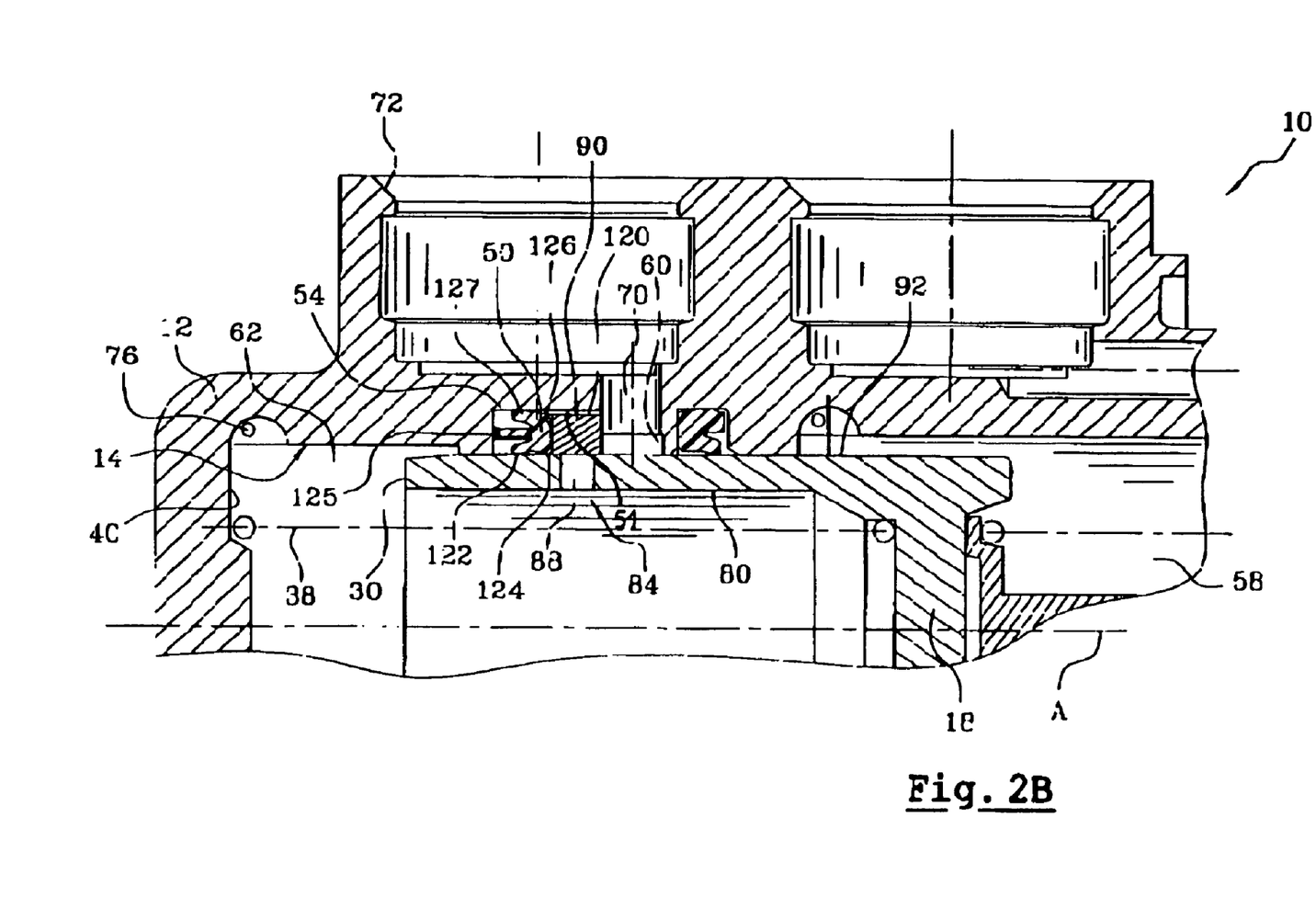
Figure 2C:
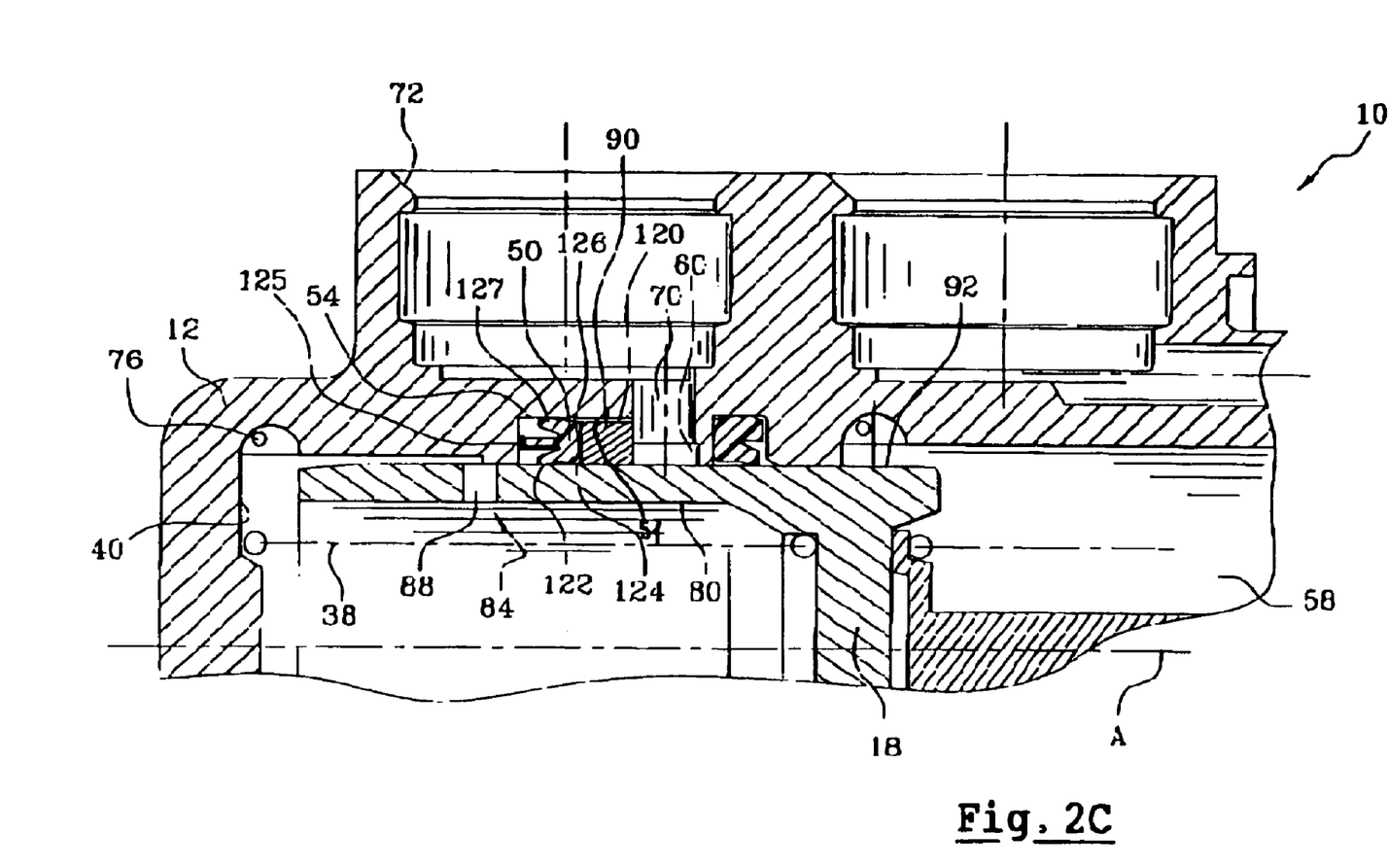

According to a first embodiment of this invention, as shown in FIG. 2A through 2C, the secondary piston 18 is made in a single piece, and the radial valve 84 comprises at least one through-hole 88 opening into the periphery and into the bore 80 of the secondary piston 18.

Here, the tubular cylindrical element 90 consists of an annular ring having an inner diameter equal to the diameter "$D_{18}$" of the piston 18, said ring being adjacent to the back face of the lip seal 50 and being accommodated inside a complementary groove 120 provided in the body 12 of the master cylinder 10.

The outer diameter of the annular ring is smaller than the inner diameter of the groove 120, thus providing a substantially annular space 51 connecting the pressure chamber 62 to the supply chamber 60.

Of course, such an arrangement is by no means limitative of the invention and the annular ring 90 might just as well be received in a cylindrical housing inserted in the body of the master cylinder said housing comprising wholly or partly the groove 120 accommodating the ring 90.

In this embodiment, the seal 50 comprises a lip 122 in a well-known manner, and besides it also comprises a further rear lip 124, bearing on the periphery of the piston 18 and moreover on a front transverse face 126 of the annular ring 90. The latter lip provides for the tightness relative to the hydraulic fluid between the seal 50 and the annular ring 90, when the through-hole 88 is situated axially at right angles with the face 126 of the annular ring 90. Furthermore, the seal comprises a front lobe 125, securing the seal 50 inside the groove 54, and an upper lobe 127, which exhibits the adequate flexibility for the passage of the hydraulic fluid through the annular space 51, which constitutes the resupply channel between the body of the master cylinder and the radially outer periphery of the ring, so as to resupply the front chamber 62 when the pressure, prevailing inside this front pressure chamber 62, is lower than that inside the supply chamber 60. The annular space is sealed off by the upper lobe 127 when the pressure, prevailing inside the pressure chamber 62, is higher than that inside the supply chamber 60.

The ring 90 is locked lengthwise along the axis A, by means of axial stops, formed in the rearward direction by an annular shoulder-forming portion at the junction of the groove 120 and the channel 70 and, in the forward direction, in this example, by the seal 50 which is in turn kept in position by the lobe 125.

In order to keep the ring 90 in position in the forward direction, a receiving groove for the ring 90 may also be provided in the groove 120, the former having a greater diameter that the groove 120. Therefore the ring 90 would bear by its front part against a shoulder. In this case, passages should also be provided for the fluid flow from the annular space towards the pressure chamber 62, for instance in the outer periphery of the ring 90 or in the shoulder, forming the front stop for the ring 90.

Figure 3:
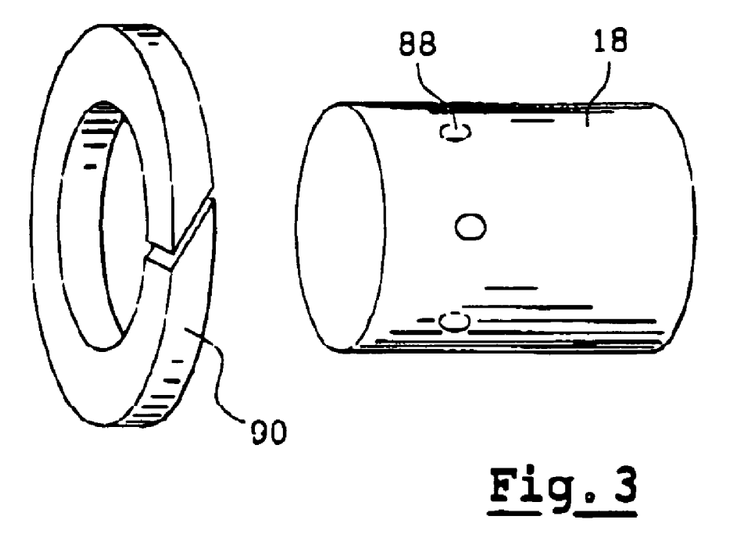
FIGS. 3 and 4 are perspective views of two embodiments of the ring forming the tubular cylindrical element according to the first embodiment of the invention.

The ring may be made according to various designs. Preferably, as shown in FIG. 3, the ring 90 may be slit so as to facilitate its fitting from the rear part of the master cylinder 10 and to ensure a leakproof tightening on the piston 18.

The annular ring 90 may be inserted using an adequate sleeve (not shown), and therefore in a somewhat deformed state, in the bore 14 after the positioning of the seal 50 and prior to the introduction of the pistons 16, 18 into the bore 14. Then the sleeve is removed and the annular ring relaxes spontaneously as it enters the groove 120.

Figure 4:
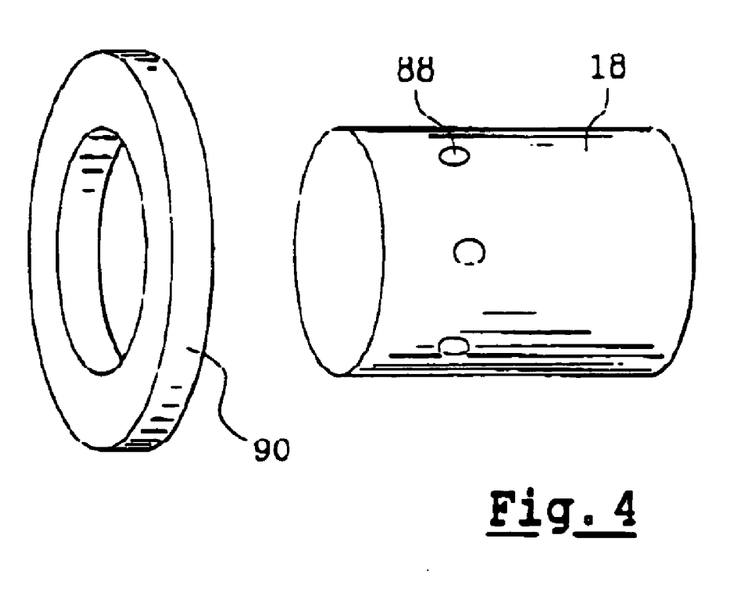
Figure 5A:
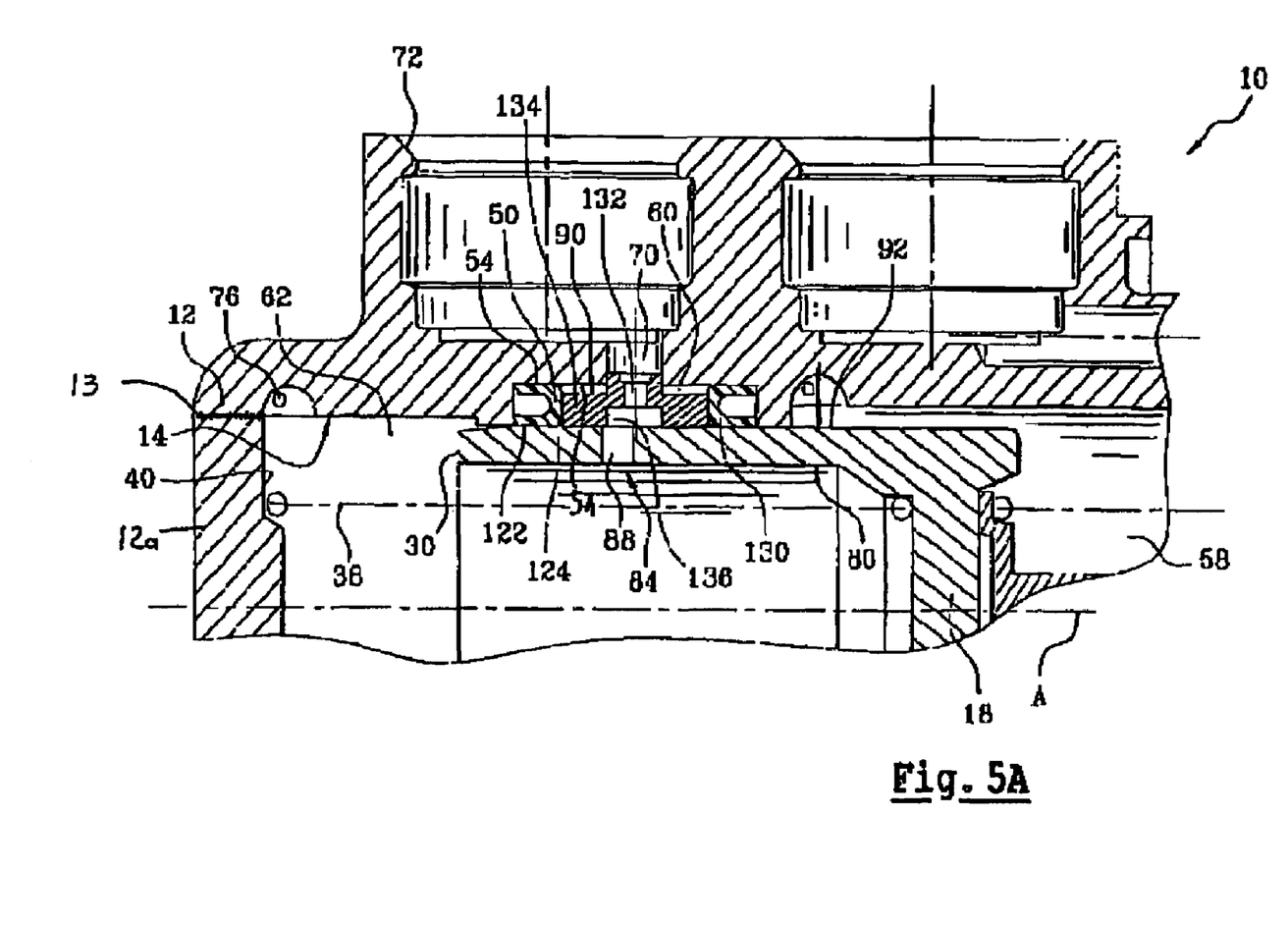
FIG. 5A–5C are detail sectional views of a master cylinder of the "tandem" type according to a second embodiment of the present invention, and represented in the rest position, in the isolating position of the secondary front pressure chamber and in the position in which the secondary piston applies a braking force, respectively.

As a variant, the master cylinder 10 may comprise a front-end transverse face 12a shown in Fig. 5 capable of being dismounted through a threaded connection 13 for the insertion of at least a solid ring 90, like the one illustrated in Fig. 4, and of the lip seal 50, from the front part of the master cylinder 10.

Said dismountable front-end transverse face can also permit the introduction of a slit ring 90, and/or of the seals 48 and 50, and of the rings, associated with both pistons 16 and 18.

Consequently, the piston 18 is capable of moving between three characteristic positions.

The dead stroke "$C_{m2}$" is reduced to the distance between the through-hole 88 and a back face 128 of the ring, constituting the element 90, as shown in FIG. 2A.

Initially, the secondary piston 18 is in its rest position, as illustrated in FIG. 2A. In this configuration, the valve 84 is open because the through-holes 88 are situated rearwards of the back face 128 of the tubular element-forming ring 90 and therefore they are not capped with such ring 90.

Afterwards and as illustrated in FIG. 2B, the secondary piston 18 moves forwards under the action of a force transmitted by the return spring 42 of the primary piston 16 and therefore the valve 84 closes because the through-hole 88 is covered now with the tubular element-forming ring 90, with the result that the hydraulic fluid flow is interrupted between the secondary rear supply chamber 60 and the secondary front pressure chamber 62, which means that the dead stroke "$C_{m2}$" has been travelled by the secondary piston 18 and consequently a hydraulic braking pressure can be produced inside the secondary front pressure chamber 62.

And ultimately, in a more advanced position of the secondary piston 18, as represented in FIG. 2C, the through-hole 88 has passed the seal 50, thus producing an increasing braking pressure, and then the piston 18 in an end-of-stroke position abuts against the front-end shoulder-forming face 40 of the bore 14 of the master cylinder 10.

Figure 5B:
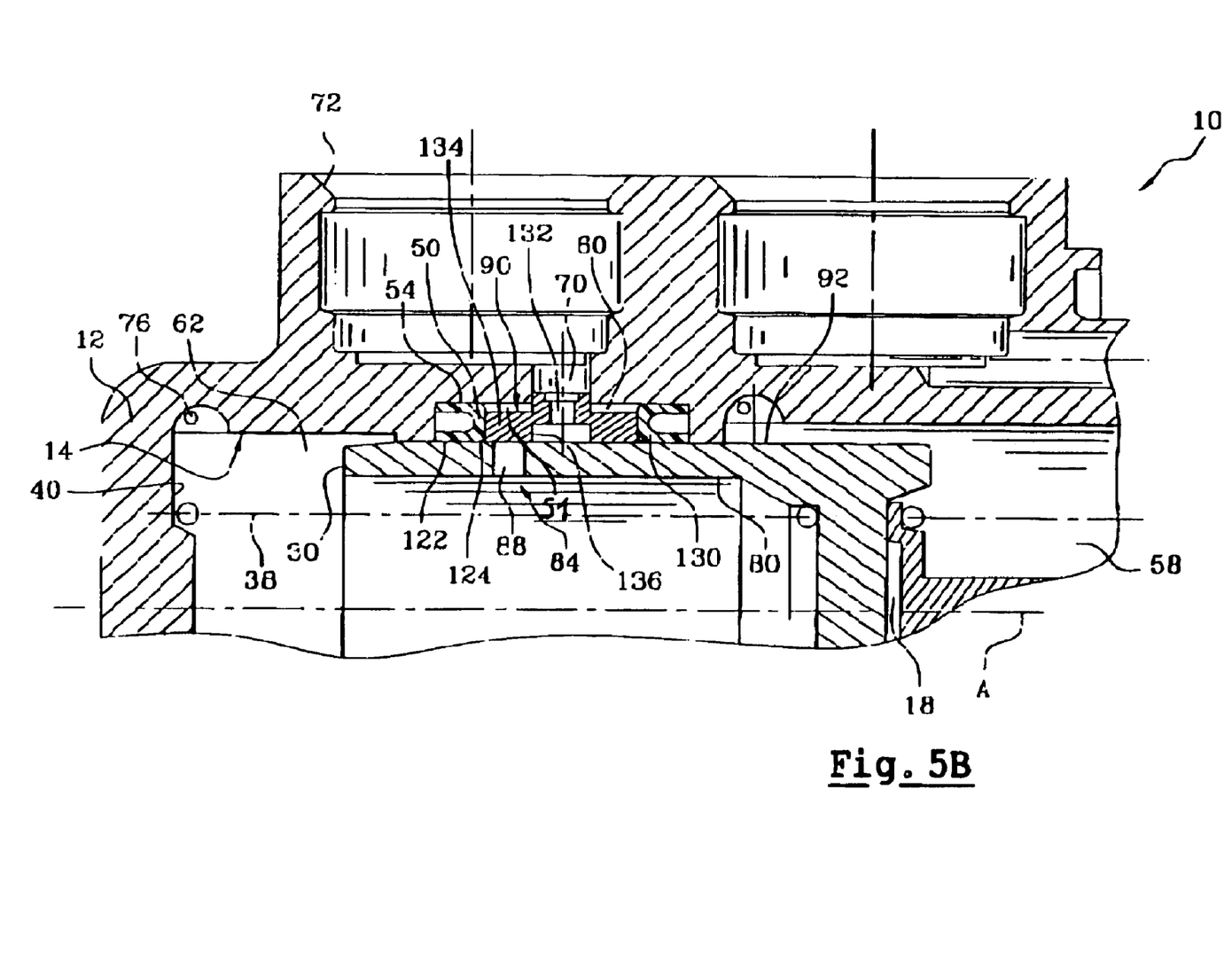
Figure 5C:
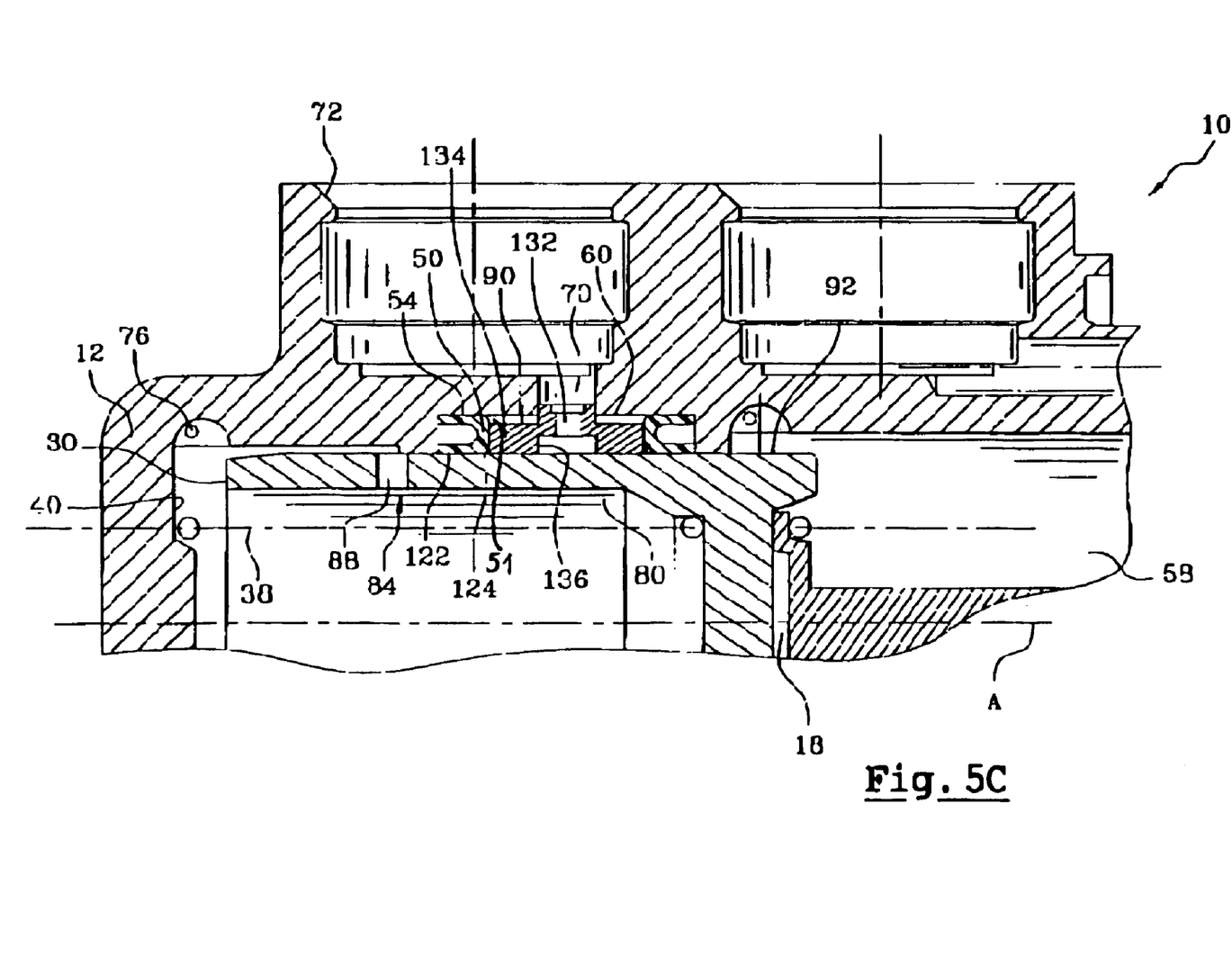

According to a second embodiment of the present invention, to be described hereunder with reference to FIG. 5A through 5C, the master cylinder comprises, in particular, a lip seal 130 arranged rearwards of the hydraulic-fluid feed channel 70 which opens into the supply chamber 60 of the secondary piston 18, and the ring 90 is axially disposed between the lip seals 50 and 130.

More particularly, the ring 90 has at least one radial through-hole 132, facing a groove connected to the hydraulic-fluid feed channel 70.

In this configuration, a further function of the ring 90 consists in maintaining the seals 50 and 130.

The ring 90 comprises a front annular section 134, the inner diameter of which is equal to that of the piston 18, said section being contiguous to the back face of the lip seal 50, whereas the outer diameter of the annular section 134 is smaller that the diameter of the groove accommodating the section 134, so as to provide an annular space 51 which constitutes a resupply channel for the front pressure chamber 62 from the rear supply chamber 60. The lip seal 50 is identical with that of the preceding embodiment and therefore it comprises two lips 122 and 124. The ring 90 also comprises a rear annular section 135 having an inner diameter which is equal to that of the piston 18.

The ring 90 is held in position lengthwise in the body of the master cylinder through a projection, surrounding the through-hole 132 in conjunction with the hydraulic-fluid feed channel 70.

Such projection is e.g. either an annular projection or a stud, the outer diameter of which is substantially equal to the diameter of the channel 70. Passages (not shown) for the flow of the hydraulic fluid from the channel 70 into the annular space are made, for instance, in the projection of the ring 90 or in the body of the master cylinder.

Consequently, the piston 18 is capable of moving between three characteristic positions.

The dead stroke "$C_{m2}$" is reduced to the distance between the through-hole 88 and a rear transverse face 136 of the front section 134 of the tubular element-forming ring 90, as shown in FIG. 5A.

Initially, the secondary piston 18 is in its rest position, as illustrated in FIG. 5A. In this configuration, the valve 84 is open because the through-holes 88 are situated rearwards of the rear face 136 of the front section 134 of the tubular element-forming ring 90.

Afterwards and as illustrated in FIG. 5B, the secondary piston 18 moves forwards under the action of a force transmitted by the return spring 42 of the primary piston 16 and therefore the valve 84 closes because the through-hole 88 is covered now with the front section 134 of the tubular element-forming ring 90, with the result that the hydraulic fluid flow is interrupted between the secondary rear supply chamber 60 and the secondary front pressure chamber 62, which means that the dead stroke "$C_{m2}$" has been travelled by the secondary piston 18 and consequently a hydraulic braking pressure can be produced inside the secondary front pressure chamber 62.

And ultimately, in a more advanced position of the secondary piston 18, as represented in FIG. 5C, the through-hole 88 has passed the seal 50, thus producing an increasing braking pressure, and then the piston 18 in an end-of-stroke position abuts against the front-end shoulder-forming face 40 of the bore 14 of the master cylinder 10.

At the end of the braking operation, if the pressure prevailing inside the pressure chamber 62 is lower that the pressure inside the supply chamber 60, the resupply of the pressure chamber 62 is carried out in the same way as for the first embodiment, represented in FIG. 2A through 2C.

Figure 6:
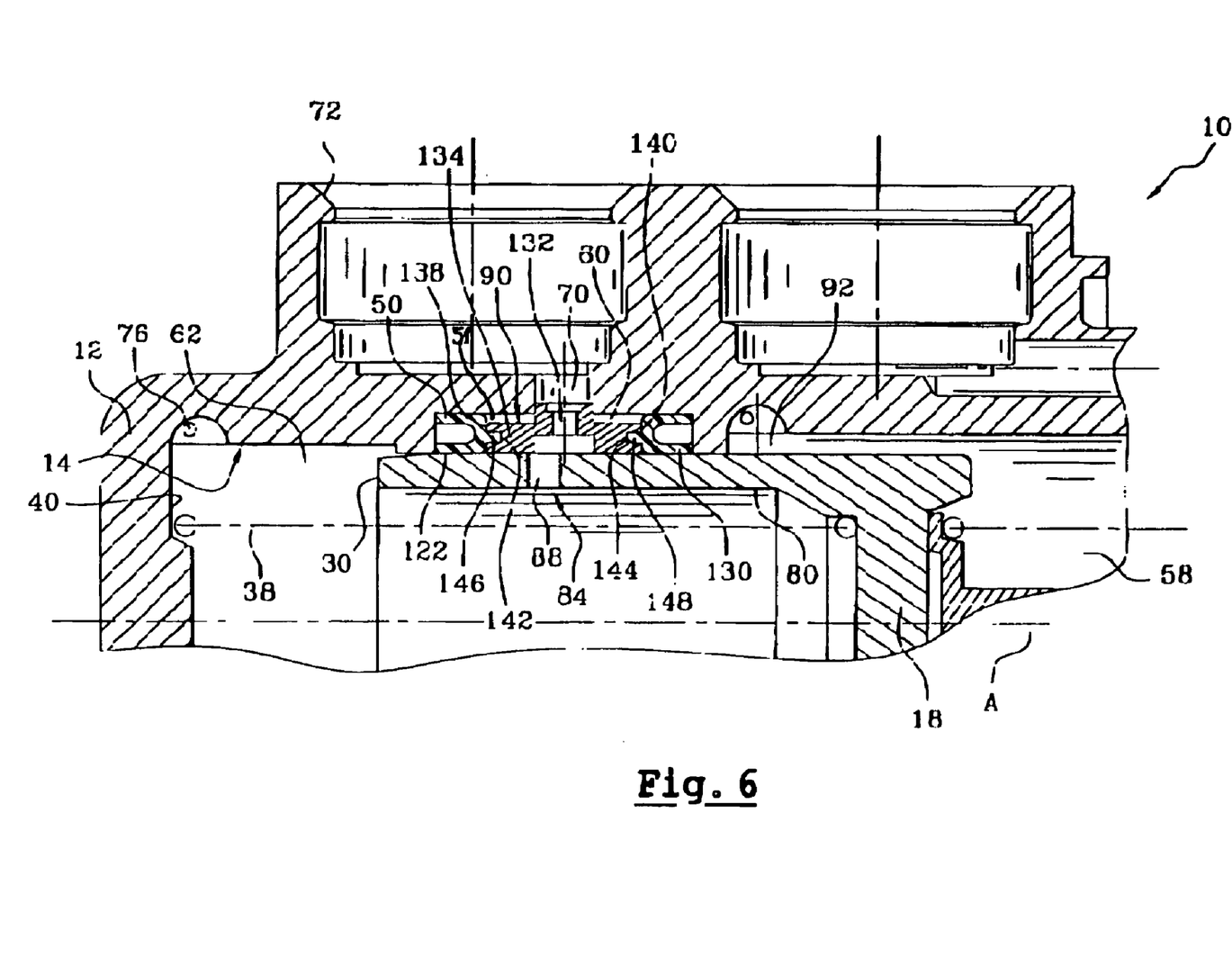
FIG. 6 is a detail sectional view of a master cylinder of the "tandem" type according to a third embodiment of the present invention, and represented in the rest position of the secondary piston.

It should be noted that, according to a variant illustrated in FIG. 6, each one of front- and rear-end transverse faces 138 and 140 of the ring 90 may comprise an annular groove 142, 144 accommodating a complementary flange 146, 148 for the retention of the adjoining lip seal 50, 130. Said flange 146, 148 may be either press fitted or stuck.

The sealing-off of the through-holes 88 by the ring 90 means the beginning of the pressure rise inside the pressure chamber 62 but, however, it is only when the through-holes 88 have passed the seal 50 that the high pressure, which is required for the braking action, is available.

Such an arrangement is by no means limitative of the invention, and the front- and rear-end transverse faces 138 and 140 of the ring 90 may exhibit any suitable shape to hold down a complementary fastening means for the retention of the adjoining lip seal 50, 130, such fastening means being not necessarily a flange.

In an advantageous manner, this configuration makes it possible to fit the ring 90 and both seals 50 and 130 all in one block and, accordingly, to dispense with a lip 124 of the seal 50, such as the above-described one.

Therefore the invention provides a master cylinder 10 having a reduced stroke, which is the token of an improved braking safety.

We claim:

1. A hydraulic master cylinder (10) for a motor vehicle having a substantially axial body (12) with a bore (14) for retaining a primary piston (16) and a secondary piston (18) that are slidingly fitted in the back-to front direction respectively, and are actuated by the driver of the vehicle between a rest rear position and a forward position to develop a braking force and wherein each piston (16, 18) is resiliently returned to the rest rear position defined by a first rear stop; at least one sealing means (48, 50) being disposed between each piston (16, 18) and the bore (14) to define a rear hydraulic-fluid supply chamber (56, 60) and a front pressure chamber (58, 62); each piston (16, 18) having a bore (78, 80) that is open in the forward direction and communicating with the front pressure chamber (58, 62); each piston (16, 18) having at least one substantially radial valve (82, 84) that is opened into its periphery and into said bore (78, 80), that moves between a let-through position that corresponds to the rest rear position of the piston (16, 18) and wherein said valve (82, 84) is situated rearwards of the sealing means (48, 50) and connects the rear supply chamber (56, 60) with the front pressure chamber (58, 62), and said valve (82, 84) having an isolating position that corresponds to the forward application position of the piston (16, 18) in which the valve (82, 84) is situated forwards of the sealing means (48, 50) to separate the rear supply chamber (56, 60) from the front pressure chamber (58, 62) so as to produce a hydraulic braking pressure inside the front pressure chamber (58, 62); and wherein the pressure chamber (62), associated with at least one piston (18), comprises at least one tubular cylindrical element (90) located outside the piston and retained axially in the body (12) of the master cylinder; and said tubular cylindrical element (90) extending axially rearwards of the sealing means (50) and when the piston (18) travels forwards obturating the radial valve (84) so as to obtain a closing travel ($C_{m2}$) of the valve which is smaller than the distance between the valve (84) and the sealing means (50); characterised in that a substantially annular space (51) for the resupply of the front pressure chamber (58, 62) is provided between the body of the master cylinder and the tubular cylindrical element (90), said space connecting the front pressure chamber (58, 62) to the rear supply chamber (56, 60), said sealing means (50) consists of a lip seal, accommodated in a groove (54) made in the bore (14) of the waster cylinder (10); and said piston (18) is made in a single piece; and said radial valve (84) has at least one through-hole (88) opening into the periphery and into the bore (80) of the piston (18); and said cylindrical element (90) includes an annular ring having an inner diameter equal to that of the piston (18) and is located adjacent to a back face of the lip seal (50) and is accommodated inside a complementary groove (120) provided in the master cylinder (10), said ring of said tubular cylindrical element (90) having a slit to facilitate insertion into said groove (120) from the rear part of the master cylinder (10); and said seal (50) includes a further lip (124) that bears on a front transverse face (126) of said tubular cylindrical element (90).

2. The master cylinder (10) according to claim 1, characterised in that the sealing means (50) comprises an upper lobe, sealing off the space (51) intended for the resupply of the front pressure chanter (58, 62) when the pressure, prevailing inside the front pressure chamber (58, 62), is higher than that inside the rear supply chamber (56, 60), and letting the brake fluid through from the rear supply chamber (56, 60) into the front pressure chamber (58, 62), when the pressure, prevailing inside the front pressure chamber (58, 62), is lower than that inside the rear supply chamber (56, 60).

3. The master cylinder (10) according to claim 1, further characterised by a front-end transverse face capable of being dismounted for the insertion of the tubular cylindrical element (90) and of the lip seal (50) from a front part of the master cylinder.

4. The master cylinder (10) according to claim 1, further characterised by a lip seal (130), arranged rearwards of a hydraulic-fluid feed channel (70) which opens into the supply chamber of the piston (18), and in that the tubular cylindrical element (90) is axially disposed between the lip seals (50, 130).

5. The master cylinder (10) according to claim 4, characterised in that the tubular cylindrical element (90) has a radial through-hole (132), facing the hydraulic-fluid feed channel (70).

6. The cylinder (10) according to claim 5, characterised in that each of the front-and rear-end transverse faces (138, 140) of the tubular cylindrical element (90)havd an annular groove (142, 144) accommodating a complementary flange (146, 148) for the retention of the adjoining lip seal (90, 130).

7. A hydraulic master cylinder (10) for a motor vehicle having a substantially axial body (12) with a bore (14) for retaining a primary piston (16) and a secondary piston (18) that are slidingly fitted in the back-to front direction respectively, and are actuated by the driver of the vehicle between a rest rear position and a forward position to develop a braking force and wherein each piston (16, 18) is resiliently returned to the rest rear position defined by a first rear stop; at least one sealing means (48, 50) being disposed between each piston (16, 18) and the bore (14) to define a rear hydraulic-fluid supply chamber (56, 60) and a front pressure chamber (58, 62); each piston (16, 18) having a bore (78, 80) that is open in the forward direction and communicating with the front pressure chamber (58, 62); each piston (16, 18) having at least one substantially radial valve (82, 84) that is opened into its periphery and into said bore (78, 80), that moves between a let-through position that corresponds to the rest rear position of the piston (16, 18) and wherein said valve (82, 84) is situated rearwards of the sealing means (48, 50) and connects the rear supply chamber (56, 60) with the front pressure chamber (58, 62), and said valve (82,84) having an isolating position that corresponds to the forward application position of the piston (16, 18) in which the valve (82, 84) is situated forwards of the sealing means (48, 50) to separate the rear supply chamber (56, 60) from the front pressure chamber (58, 62) so as to produce a hydraulic braking pressure inside the front pressure chamber (58, 62); and wherein the pressure chamber (62), associated with at least one piston (18), comprises at least one tubular cylindrical element (90) located outside the piston and retained axially in the body (12) of the master cylinder; and said tubular cylindrical element (90) extending axially rearwards of the sealing means (50) and when the piston (18) travels forwards obturating the radial valve (84) so as to obtain a closing travel ($C_{m2}$) of the valve which is smaller than the distance between the valve (84) and the sealing means (50); characterised in that a substantially annular space (51) for the resupply of the front pressure chamber (58, 62) is provided between the body of the master cylinder and the tubular cylindrical element (90), said space connecting the front pressure chamber (58, 62) to the rear supply chamber (56, 60), said sealing means (50) consists of a lip seal, accommodated in a groove (54) made in the bore (14) of the master cylinder (10); and said piston (18) is made in a single piece; and said radial valve (84) has at least one through-hole (88) opening into the periphery and into the bore (80) of the piston (18); and said cylindrical element (90) includes an annular ring having an inner diameter equal to that of the piston (18) and is located adjacent to a back face of the lip seal (50) and is accommodated inside a complementary groove (120) provided in the master cylinder (10), a front-end transverse face (126) that is dismounted from the tubular cylindrical element (90) prior to the insertion of the tubular cylindrical element (90) and of the lip seal (50) into a front part of the master cylinder; and said seal (50) including a further lip (124) that bears on said front transverse face (126) of said tubular cylindrical element (90).

* * * * *